United States Patent
Kang et al.

(10) Patent No.: US 9,258,066 B2
(45) Date of Patent: Feb. 9, 2016

(54) INTERFERENCE REMOVAL METHOD IN MULTI-NODE SYSTEM AND TERMINAL USING SAME

(75) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 13/704,199

(22) PCT Filed: Jun. 13, 2011

(86) PCT No.: PCT/KR2011/004302
§ 371 (c)(1),
(2), (4) Date: Jan. 2, 2013

(87) PCT Pub. No.: WO2011/159072
PCT Pub. Date: Dec. 22, 2011

(65) Prior Publication Data
US 2013/0094547 A1    Apr. 18, 2013

Related U.S. Application Data (60) Provisional application No. 61/354,674, filed on Jun. 14, 2010.

(30) Foreign Application Priority Data

Jun. 7, 2011  (KR) .................. 10-2011-0054345

(51) Int. Cl.
*H04B 15/00*    (2006.01)
*H04B 1/38*    (2015.01)
(Continued)

(52) U.S. Cl.
CPC .................. *H04B 15/00* (2013.01); *H04B 1/38* (2013.01); *H04B 7/0456* (2013.01); *H04B 7/0639* (2013.01)

(58) Field of Classification Search
CPC .................................. H04B 15/00; H04B 1/38
USPC ................................... 343/373; 370/328, 345
See application file for complete search history.

(56) References Cited

U.S. PATENT DOCUMENTS

2009/0046009 A1*  2/2009  Fujii ............................ 342/373
2009/0066577 A1    3/2009  Kim et al.
(Continued)

FOREIGN PATENT DOCUMENTS

KR    10-2009-0026101 A    3/2009
KR    10-2009-0031082 A    3/2009
KR    10-2010-0060958 A    6/2010

*Primary Examiner* — Brandon Renner
*Assistant Examiner* — Manuel Rangel
(74) *Attorney, Agent, or Firm* — Birch, Stewart, Kolasch & Birch, LLP (57) ABSTRACT

The present invention provides an interference removal method in a multi-node system. The interference removal method comprises receiving node information from a base station; receiving a first signal from an objective node and a second signal from an interference node; and removing interference due to the second signal by applying a receive filter to a receive signal including the first and the second signal, where the node information includes at least one of information about a reference signal included in the second signal and information about a pre-coding matrix applied to the second signal and the receive filter is determined based on the node information.

9 Claims, 9 Drawing Sheets (51) Int. Cl.
*H04B 7/04* (2006.01)
*H04B 7/06* (2006.01)

(56) References Cited

U.S. PATENT DOCUMENTS

2009/0219838 A1* 9/2009 Jia et al. .................. 370/278
2009/0286482 A1* 11/2009 Gorokhov et al. ............ 455/63.1
2009/0325591 A1* 12/2009 Liu et al. .................... 455/452.2
2010/0034146 A1 2/2010 Hou et al.
2010/0099428 A1* 4/2010 Bhushan et al. ........... 455/452.1
2010/0246560 A1 9/2010 Kim
2010/0309861 A1* 12/2010 Gorokhov et al. ............ 370/329
2011/0045782 A1* 2/2011 Shin et al. .................. 455/67.13
2012/0281683 A1* 11/2012 Falconetti et al. ............ 370/336

* cited by examiner

INTERFERENCE REMOVAL METHOD IN MULTI-NODE SYSTEM AND TERMINAL USING SAME

CROSS REFERENCE TO RELATED APPLICATIONS

This application is the National Phase of PCT/KR2011/004302 filed on Jun. 13, 2011, which claims priority under 35 U.S.C. §119(e) to U.S. Provisional Application No. 61/354,674 filed on Jun. 14, 2010 and under 35 U.S.C. §119(a) to Patent Application No. 10-2011-0054345 filed in the Republic of Korea on Jun. 7, 2011, all of which are hereby expressly incorporated by reference into the present application.

TECHNICAL FIELD

The present invention relates to wireless communication and more particularly, an interference removal method in a multi-node system and a terminal using the method.

BACKGROUND ART

Recently the amount of data transmission in wireless communication networks is rapidly growing. This sharp increase in the amount of data transmission is largely attributed to machine-to-machine (M2M) communication and advent and wide use of various kinds of devices such as smart phones, tablet PCs, and so on. New technologies are emerging to meet the requirement for supporting the large amount of data transmission: carrier aggregation technology, cognitive radio technology, and so on for making an effective use of more frequency bands; and multi-antenna technology, multi-base station collaboration technology, and so on for increasing data capacity with limited frequency resources.

Current wireless communication networks are evolving into such a direction that density of nodes is getting higher. Here, a node refers to an antenna or a group of antennas placed apart from each other by more than a predetermined interval in a distributed antenna system (DAS) but the term can be used in a much broader sense without being limited to the definition above. In other words, a node may correspond to a pico-cell base station (PeNB), home base station (HeNB), remote radio head (RRH), remote ratio unit (RRU), relay, distributed antenna, and so on.

A wireless communication system having high density of nodes can show much better system performance by utilizing collaboration between the nodes. In other words, if each node operates as an independent base station (BS) (advanced BS (ABS), node-B (NB), eNode-B (eNB), access point (AP), and so on) and transmission to and from each node is managed by one control station and each node operates like an antenna (or a group of antennas) in one cell, much better system performance can be achieved compared with a case where the individual nodes do not collaborate with each other. In this case, a multi-node system can be called a distributed antenna system (DAS).

Similarly, a multi-node system can operate as a multi-cell system carrying out scheduling and handover with distinctive identifiers for the respective nodes. If a multi-cell system is configured in such a way that coverage of each node overlaps with each other, the system is called a multi-tier network.

An interference removal method which can be used in a multi-node system and a terminal using the method are necessary.

DISCLOSURE

Technical Problem

An objective of the present invention is to provide an interference removal method in a multi-node system and a terminal using the method.

Technical Solution

An interface removal method in a multi-node system according to one aspect of the present invention comprises receiving node information from a base station; receiving a first signal from an objective node and a second signal from an interference node; and removing interference due to the second signal by applying a receive filter to a receive signal including the first and the second signal, where the node information includes at least one of information about a reference signal included in the second signal and information about a pre-coding matrix applied to the second signal and the receive filter is determined based on the node information.

The objective node and the interference node are connected to the base station in a wireless or wired manner and can be controlled by the base station.

The first signal includes a first reference signal and first data while the second signal includes a second reference signal and second data.

The first reference signal is a reference signal pre-coded into a pre-coding matrix applied to the first data.

The node information further includes configuration information about the first and the second reference signal, where the configuration information includes information about at least one from among the number of antenna ports of the objective and the interference node, node identifier (ID), and the number of data streams.

The second reference signal is a reference signal pre-coded into a pre-coding matrix applied to the second data. Alternatively, the second reference signal may correspond to a reference signal not pre-coded into a pre-coding matrix applied to the second data.

The method further comprises receiving a first reference signal from an objective node and receiving a second reference signal from the interference node; obtaining a receive filter and a pre-coding matrix to be applied to the objective node by using the first and the second reference signal; providing the pre-coding matrix to the base station as feedback; receiving a receive signal including first data transmitted from the objective node and second data transmitted from the interference node; and decoding the first data after removing interference due to the second data by applying the receive filter to the receive signal.

The first data is the data pre-coded into the pre-coding matrix and the receive filter is configured to exist in the null space of an interference channel matrix which is represented by multiplication of a channel matrix between the pre-coding matrix applied to the second reference signal and the interference node.

The first reference signal may correspond to a reference signal to which a pre-coding matrix has not been applied.

The method may further comprise transmitting an index of a pre-coding matrix which maximizes the first signal element to the base station after removing interference caused by the second signal by applying a receive filter to the receive signal. The index of a pre-coding matrix which maximizes the first signal element may correspond to the index of a matrix selected from a predetermined codebook.

The node information may further include a field indicating whether to apply removing interference caused by the second signal.

The receive filter can be constructed in such a way to exist in the null space of an interference channel matrix which is represented by multiplication of a channel matrix between the pre-coding matrix applied to the second signal and the interference node.

In case the second reference signal is a pre-coded reference signal, the node information further comprises information about a scheduling period or a scheduling method of the interference node.

A terminal according to another aspect of the present invention comprises an RF unit transmitting and receiving radio signals; and a processor connected to the RF unit, where the processor receives node information from a base station, receives a first signal from an objective node, receives a second signal from an interference node, and removes interference caused due to the second signal by applying a receive filter to a receive signal including the first and the second signal, where the node information includes at least one of information about a reference signal of the interference node and information about a pre-coding matrix applied to the second signal; and the receive filter is determined based on the node information.

The first signal includes a first reference signal and first data while the second signal includes a second reference signal and second data. The node information further includes configuration information about the second reference signal, where the configuration information includes information about at least one from among the number of antenna ports of the objective and the interference node, node identifier (ID), and the number of data streams.

The processor receives a first reference signal from an objective node; receives a second reference signal from the interference node and obtains a receive filter and a pre-coding matrix to be applied to the objective node by using the first and the second reference signal; provides the pre-coding matrix to the base station as feedback; receives a receive signal including first data transmitted from the objective node and second data transmitted from the interference node; and decodes the first data after removing interference due to the second data by applying the receive filter to the receive signal.

The first data is the data pre-coded into the pre-coding matrix and the receive filter is configured to exist in the null space of an interference channel matrix which is represented by multiplication of a channel matrix between the pre-coding matrix applied to the second reference signal and the interference node.

Advantageous Effects

In a multi-node system, an objective node communicating with a terminal may coexist with an interference node transmitting a signal functioning as interference in the terminal. According to the present invention, interference due to the interference node can be relieved; thus the terminal can carry out reliable communication with the objective node.

MODE FOR INVENTION

The technology described in the following can be used for various kinds of multiple access schemes such as code division multiple access (CDMA), frequency division multiple access (FDMA), time division multiple access (TDMA), orthogonal frequency division multiple access (OFDMA), single carrier-frequency division multiple access (SC-FDMA), and the like. CDMA can be implemented by such radio technology as UTRA (Universal Terrestrial Radio Access) or CDMA2000. TDMA can be implemented by such technology as GSM (Global System for Mobile communication), GPRS (General Packet Radio Service), or EDGE (Enhanced Data Rates for GSM Evolution). OFDMA can be implemented by such radio technology as IEEE (Institute of Electrical and Electronics Engineers) 802.11 (Wi-Fi), IEEE 802.16 (WiMAX), IEEE 802.20, or E-UTRA (Evolved UTRA). UTRA is part of UMTS (Universal Mobile Telecommunication System). The 3GPP (3rd Generation Partnership Project) LTE (Long Term Evolution) is part of E-UMTS (Evolved UMTS) using the E-UTRA, employing the OFDMA in the downlink transmission while the SC-FDMA in the uplink transmission. The LTE-A (Advanced) is an evolved model of the LTE system.

Figure 1:
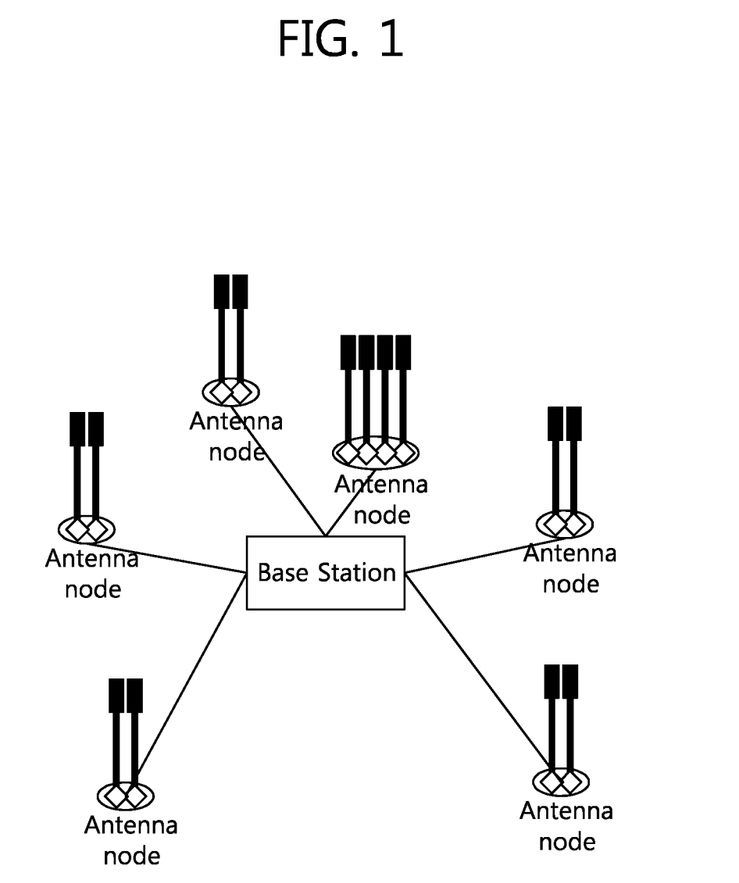
FIG. 1 illustrates an example of a multi-node system.

FIG. 1 illustrates an example of a multi-node system;
With reference to FIG. 1, a multi-node system comprises a base station and a plurality of nodes.

In FIG. 1, a node marked antenna node may indicate a macro base station, pico-cell base station (PeNB), home base station (HeNB), RRH (Remote Radio Head), relay, distributed antenna, and the like. Such a node is also called a point.

In a multi-node system, if transmission and reception of each node is managed by one base station controller and thus individual nodes function as part of one single cell, the system may be regarded as a distributed antenna system which forms one single cell. In a distributed antenna system, node IDs may be assigned separately to individual nodes or the individual nodes may operate as a group of antennas in a cell without particular node IDs. In other words, a distributed antenna system (DAS) refers to a system where antennas (namely, nodes) are disposed being distributed at various positions in a cell and the antennas are managed by a base station. A distributed antenna system is different from a conventional centralized antenna system (CAS) in that antennas of a base station are disposed being concentrated in the center of a cell.

In a multi-node system, if separate cell IDs are assigned to the respective nodes and each node performs scheduling and handover, the system may be regarded as a multi-cell system (for example, a macro cell/pemto cell/pico cell). If coverage of each node in a multi-cell system overlaps with each other, the system is called a multi-tier network.

Figure 2:
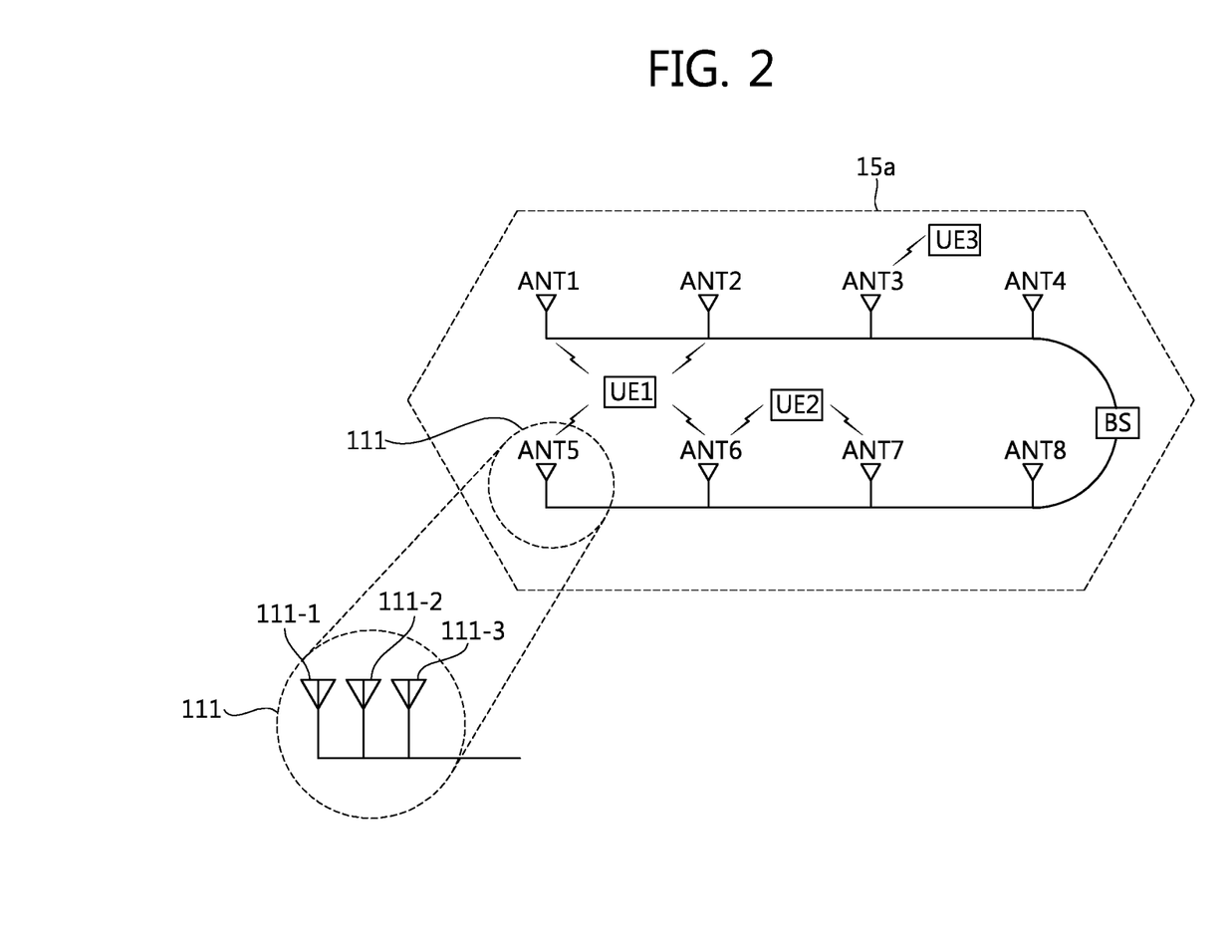
FIG. 2 is one example of a multi-node system, illustrating a distributed antenna system.

FIG. 2 is one example of a multi-node system, illustrating a distributed antenna system.

With reference to FIG. 2, a distributed antenna system (DAS) comprises a base station (BS) and a plurality of base station antennas (for example, ant 1 to ant 8; hereinafter a base station antenna is called an antenna for short). Antennas (ant 1 to ant 8) can be connected to a base station (BS) through wire. A distributed antenna system is different from a conventional centralized antenna system (CAS) in that antennas are disposed being distributed at various positions in a cell 15a without being concentrated at a particular position of the cell, for example, center of the cell. As shown in FIG. 2, antennas may be disposed in such a way that one antenna is disposed for each place separated apart from each other (antennas 1 to 4, 6 to 8) or multiple antennas 111-1, 111-2, 111-3 may be disposed in a compact formation like antenna 5. Antennas disposed in a compact formation may form a single antenna node.

Antennas can be distributed to have their coverage overlap with each other allowing transmission of rank 2 or more. For example, the coverage of each antenna may reach neighboring antennas. In this case, terminals belonging to a cell may perceive different signal strength of a signal received from a plurality of antennas depending on their positions within the cell, channel status, and so on. With reference to FIG. 2, the terminal 1 (UE 1) receives a signal of good receive sensitivity from antennas 1, 2, 5, 6. On the other hand, a signal transmitted from antennas 3, 4, 7, 8 may exert a negligible effect on terminal 1 due to path loss.

Terminal 2 (UE 2) can receive a signal of good receive sensitivity from antennas 6, 7 and signals transmitted from the remaining antennas may have a negligible effect. In the same way, in case of terminal 3 (UE 3), a signal of good receive sensitivity is obtained only from antenna 3 while signals from the remaining antennas reveal a signal strength weak enough to be ignored.

In a distributed antenna system, it may be easy for terminals placed apart from each other within a cell to carry out MIMO communication. In the above example, terminal 1 may carry out communication through antennas 1, 2, 5, 6 while terminal 2 carries out communication through antenna 7 and terminal 3 through antenna 3. Antennas 4, 8 may transmit a signal meant for terminal 2 or 3 or no signal at all. In other words, antennas 4, 8 may operate off-line depending on a situation.

As described above, in case MIMO communication is carried out in a distributed antenna system, a layer for each terminal (namely, the number of transmission streams) may be implemented in various ways. Also, an antenna (or a group of antennas) assigned to each terminal may differ from each other. In other words, a distributed antenna system can support a particular antenna for each terminal from among the whole antennas belonging to the system. The antenna supporting a particular terminal may change as time passes by.

Figure 3:
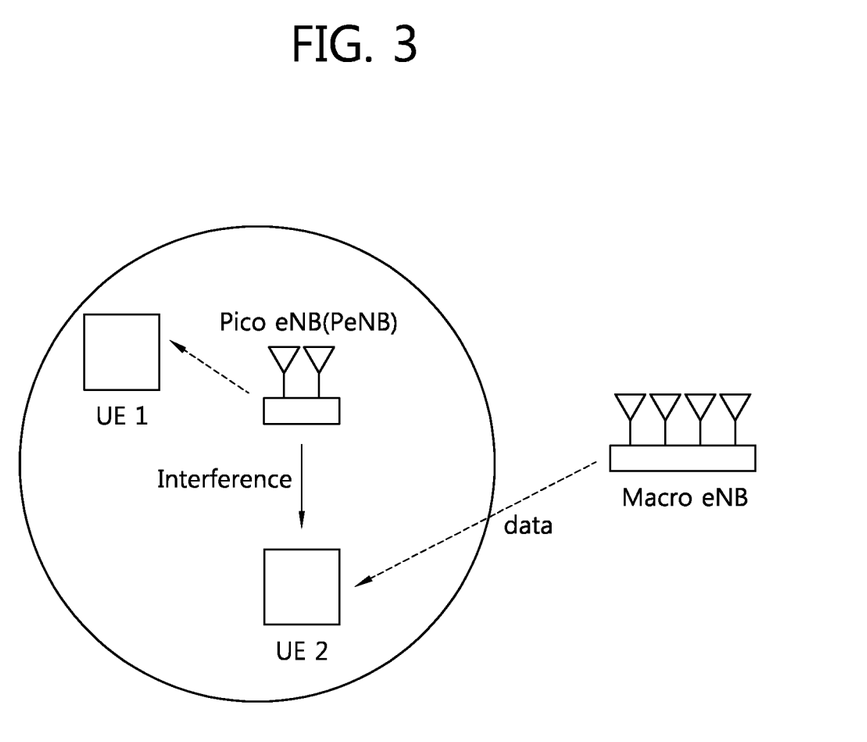
FIG. 3 is one example of a multi-node system, illustrating a multi-tier network.

FIG. 3 is one example of a multi-node system, illustrating a multi-tier network.

With reference to FIG. 3, a multi-tier network can be realized in such a way that coverage of a macro base station (macro eNB) and that of a pico-cell base station (PeNB) overlap with each other. At this time, the macro base station and the pico-cell base station may use individual IDs.

A pico-cell base station distinguishes registered users from non-registered users and allows connection to the pico-cell only for the registered users. Pico-cell base stations allowing connection only for registered users are called to belong to a closed subscriber group (CSG) while those allowing connection even for ordinary users are called to belong to an open subscriber group (OSG). Base stations belonging to different groups may be combined together and used.

In case a pico-cell base station is operated according to the CSG scheme, strong interference may be exerted on a terminal not registered for base station. For example, if a terminal 2 (UE 2) communicating with a macro base station is not registered for a pico-cell station and moves into the coverage area of the pico-cell base station, a signal transmitted from the pico-cell base station exerts strong interference on the terminal 2.

To solve the interference problem as introduced above, various methods are under discussion, for example, in the LTE-A, the IEEE 802.16m, and so on. For example, frequency division multiplexing, time division multiplexing, downlink power control, and so on are a few techniques worth consideration for avoiding inter-cell interference. These techniques are also used for reducing interference among multiple cells having the same coverage. However, since these methods apply a method of assigning different resources to individual cells, namely, a method of dividing available resources for the individual resources and assigning the divided resources to each cell, system performance is degraded and scheduling is restricted.

In this respect, a method of relieving interference between cells and a terminal using the method are necessary in a multi-node system.

First described is a mathematical model in case a terminal receives a signal from a plurality of nodes in a multi-node system. In what follows, for the convenience of description, a node to which a terminal attempts to establish communication is called an objective node while a node exerting interference on the terminal is called an interference node.

Suppose there are N nodes around the terminal. At this time, it is assumed that the number of transmit antennas for the n-th node is $N_n^{tx}$ and the number of receive antennas for the terminal is $N^{rx}$. Then for a particular frequency band, the channel from the n-th node to the terminal can be represented by $N^{rx} \times N_n^{tx}$ matrix, $H_n$. In other words, $H_n$ is $N^{rx} \times N_n^{tx}$ matrix.

Suppose a transmit vector $x_n$ transmitted from the n-th node is $N_n^{tx} \times 1$. If a linear pre-coding is applied to the n-th node, the transmit vector $x_n$ is obtained in the form of multiplication of the pre-coding matrix $P_n$ of the n-th node and a data transmit vector $s_n$. At this time, $P_n = N_n^{tx} \times r_n$ matrix and $s_n$ is $r_n \times 1$ vector, where $r_n$ is a transmission rank of the n-th node, namely, the number of data streams. Then a receive vector in the form of $N^{rx} \times 1$ received by the terminal can be modeled as follows.

$$y = \sum_{n=1}^{N} H_n P_n s_n + z, \qquad [\text{Eq. 1}]$$

where z is a receive noise vector.

If it is assumed that the terminal receives a signal in question from a first node (namely, n=1) and treats a signal transmitted from the remaining node (in other words, the first node becomes the objective node and the remaining nodes become interference nodes), a receive vector y received by the terminal can be expressed by Eq. 2:

$$y = H_1 P_1 s_1 + [H_2 P_2\ H_3 P_3 \ldots H_N P_N] s + z, \qquad [\text{Eq. 2}]$$

where $s = [s_2^T s_3^T \ldots s_N^T]^T$ in equation 2. Since s is a data signal, it changes according to transmission resources, namely, time and frequency resources; however, the pre-coding matrix used by the node can be the same for a particular interval of the frequency and/or time domain. For example, if a particular node performs a semi-static scheduling, the pre-coding matrix can be the same for a particular time interval.

As shown in Eq. 2, a signal received by the terminal can be divided into a signal coming from an objective node and a signal coming from an interference node. If a matrix related to the signal from an interference node is called an interference channel matrix I, the interference channel matrix I can be represented as follows:

$$I=[H_2P_2 \ H_3P_3 \ldots H_NP_N] \qquad [\text{Eq. 3}]$$

In this case, if the terminal is capable of estimating an interference channel matrix $I=[H_2P_2 \ H_3P_3 \ldots H_NP_N]$ along with a channel $H_1$ of a first node, interference can be reduced by a receive filter in a proper way. Also, the terminal may be able to find an effective form of pre-coding matrix (vector) $P_1$ from the relationship with the first node.

The number of columns of the interference channel matrix I can be represented as follows.

$$\sum_{n=2}^{N} r_n, \qquad [\text{Eq. 4}]$$

where $r_n$ is a transmission rank of the n-th node, namely, the number of data streams.

Theoretically, if the number of receive antennas of a terminal $N^{rx}$ is larger than the number of columns of the interference channel matrix I, there can be at least one receive filter capable of removing interference. If the number of receive antennas of a terminal $N^{rx}$ is smaller than the number of columns of the interference channel matrix I, a receive filter can be constructed along a direction of an eigenvector of the interference channel matrix I and used for minimizing interference.

Alternatively, an interference removal method can be applied after separating the interference channel matrix I into a dominant interference channel matrix showing large interference (which is represented by $I_{dom}$) and a non-dominant interference channel matrix which shows little interference and thus can be negligible (which is represented by $I_{non-dom}$). The interference channel matrix I can be represented as follows.

$$I=I_{dom}+I_{non-dom} \qquad [\text{Eq. 5}]$$

In Eq. 5, $I_{dom}$ refers to an interference channel matrix meant for those streams which cannot be ignored because of large magnitude of interference elements while $I_{non-dom}$ refers to an interference channel matrix meant for those streams whose influence can be ignored since the interference elements are of small magnitude. In other words, an interference channel matrix can be constructed based on the limited number of streams from the interference channel matrix I and an interference removal method can be applied afterwards. If a receive filter is made to belong to the null-space of $I_{dom}$, interference caused by $I_{dom}$ is removed and interference due to $I_{non-dom}$ is treated as noise being included in z.

As described above, a method of separating the interference channel matrix I and removing only the interference caused by the limited number of streams enables the terminal to apply an interference removal technique by using a smaller number of receive antennas.

After the terminal estimates the interference channel matrix I and a channel matrix $H_1$ for the objective node, the terminal can find a receive filter V and a pre-coding matrix $P_1$.

In what follows, a method for the terminal to find a receive filter V is described.

If the terminal applies a receive filter V to a receive vector y, the Eq. 2 can be expressed as Eq. 6:

$$Vy=VH_1P_1s_1+Vz, \qquad [\text{Eq. 6}]$$

where V and $P_1$ are a unitary matrix and it is assumed that V belongs to the null-space of I. Then the terminal only has to find V and $P_1$ which maximize $\|VH_1P_1\|$.

If the terminal estimates a dominant interference channel matrix $I_{dom}$ and a channel matrix for an objective node $H_1$ and V belongs to the null space of $I_{dom}$, Eq. 2 can be re-phrased by incorporating the receive filter V as follows:

$$Vy=VH_1P_1s_1+V(i_{non-dom}+z) \qquad [\text{Eq. 6}]$$

where $i_{non-dom}$ is $I_{non-dom}$ s. At this time, $V^*i_{non-dom}$ is treated as if it is a noise signal. Then the terminal only has to find V and $P_1$ which maximize $\|VH_1P_1\|$.

Since the receive filter V exists in the null space of I or $I_{dom}$ in Eqs. 6 and 7, only those elements related to the data to receive $s_1$ among the receive vector y are remained finally. The terminal finds V and $P_1$ which maximize $\|VH_1P_1\|$ while satisfying the constraint that $P_1$ and V each are a unitary matrix and the null-space conditions. $P_1$ can be found in a predetermined set, namely, within a codebook; the terminal can provide an index of a selected matrix within the codebook, namely, PMI (pre-coding matrix index) to a base station as feedback. The terminal may transmit a feedback signal directly to the base station or transmit the signal through an interference node.

Similarly the terminal may find V and $P_1$ which maximize while minimizing multiplication of a receive filter V and an interference channel matrix I, namely, minimizing the magnitude of VI.

As described above, in case the terminal knows an interference channel matrix and is equipped with a plurality of receive antennas, interference caused by an interference node in a receive vector can be removed or minimized and information about a pre-coding matrix providing a maximum performance gain (for example, PMI) can be provided as feedback.

According to the conventional technology, however, it is difficult for a terminal belonging to a multi-node system to estimate an interference channel matrix and even if the interference channel matrix is estimated anyhow, interference cannot be removed easily in case the pre-coding matrix of an interference node is changed.

In what follows, an interference removal method and a terminal using the method in a multi-node system will be described. A multi-tier system is taken as an example of a multi-node system; however, the present invention is not limited to the above assumption and can be applied to a distributed antenna system.

A reference signal transmitted by a node consists of a non-precoded pilot signal (in what follows, it is referred to as N reference signal) and a precoded reference signal (in what follows, it is referred to as P reference signal). Examples of N reference signal include CRS (Cell-specific Reference Signal), CSI-RS (Channel Status Information Reference Signal) of the LTE system while an example of P reference signal includes DM-RS (Demodulation Reference Signal) of the LTE system.

Figure 4:
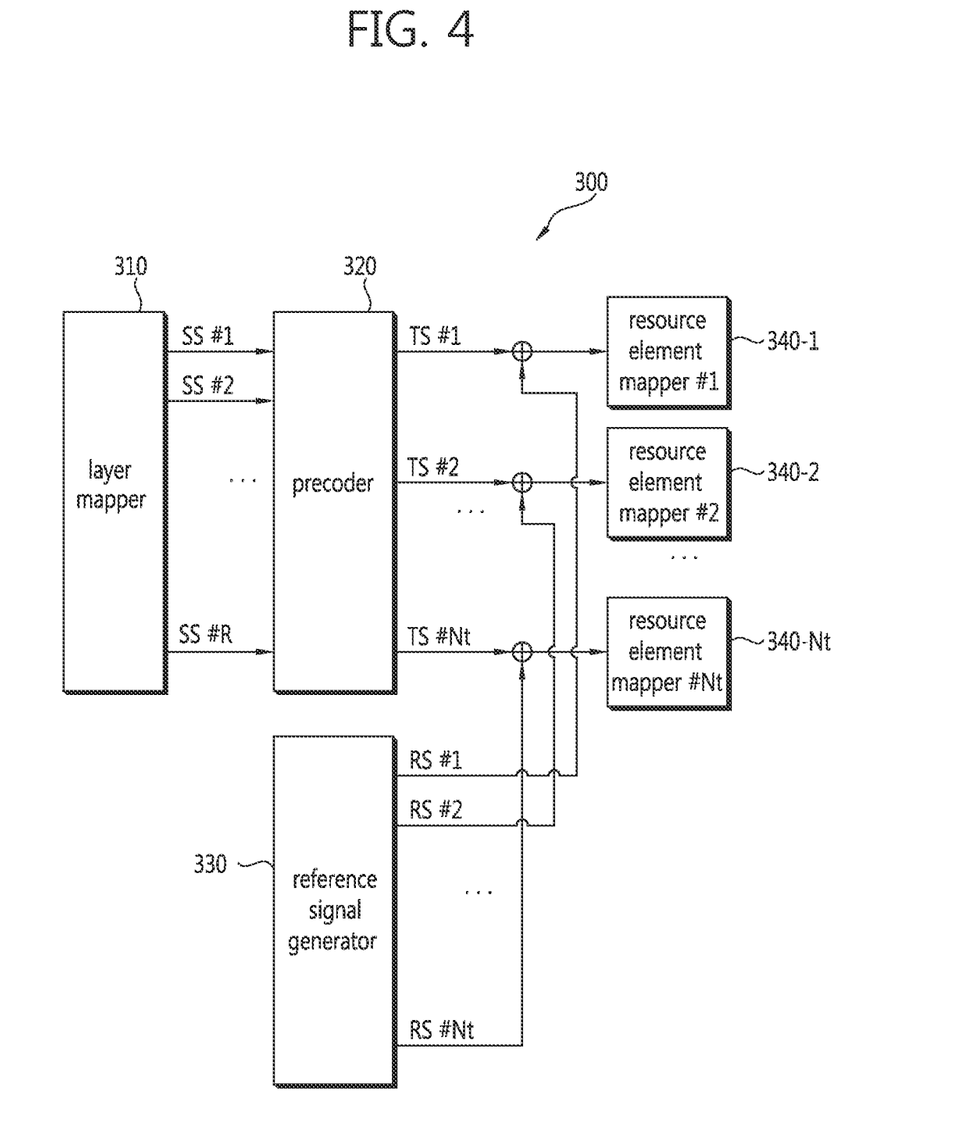
FIG. 4 is a block diagram illustrating an example where a transmitter of a node generates an N reference signal.

FIG. 4 is a block diagram illustrating an example where a transmitter of a node generates an N reference signal.

With reference to FIG. 4, a transmitter 300 of a node comprises a layer mapper 310, a precoder 320, a reference signal generator 330, and Nt resource element mappers 340-1, ..., 340-Nt. Here, Nt represents the number of transmit antennas of the transmitter 300. It is assumed that the number of spatial layers is R.

The layer mapper 310 is connected to the precoder 320. The precoder 320 and the reference signal generator 330 are each connected to the Nt resource element mappers 340-1, ..., 340-Nt.

The layer mapper 310 is formed to generate R spatial streams (SS #1, SS #2, ..., SS #R) for R spatial layers. The spatial streams (SS #1, ..., SS #R) may include data transmitted by the node to the terminal.

The precoder 320 is formed to generate Nt transmit streams (TS #1, TS #2, ..., TS #Nt) by applying a precoding matrix to the R spatial steams.

The reference signal generator 330 generates a reference signal sequence corresponding to a reference signal. The reference signal sequence consists of a plurality of reference symbols. Arbitrary sequences can be used for the reference signal sequence without any particular constraints.

The reference signal generator 330 is formed to generate a reference signal sequence for each of Nt transmit antennas. The reference signal generator 330 is formed to generate Nt reference signal sequences (RS #1, ..., RS #Nt). Each of the Nt reference signal sequences includes a plurality of reference signal symbols. A reference signal symbol may be a complex number symbol.

Each of the Nt resource mappers 340-1, ..., 340-Nt receives a transmit stream and a reference signal sequence and is formed to map the transmit stream and the reference signal sequence to resource elements. The resource element mapper #n (340-n) receives TS #n and RS #n (where n=1, 2, ..., Nt) and maps them to resource elements.

In other words, the N reference signal is transmitted without a precoding matrix meant for data not being applied to the N reference signal.

Figure 5:
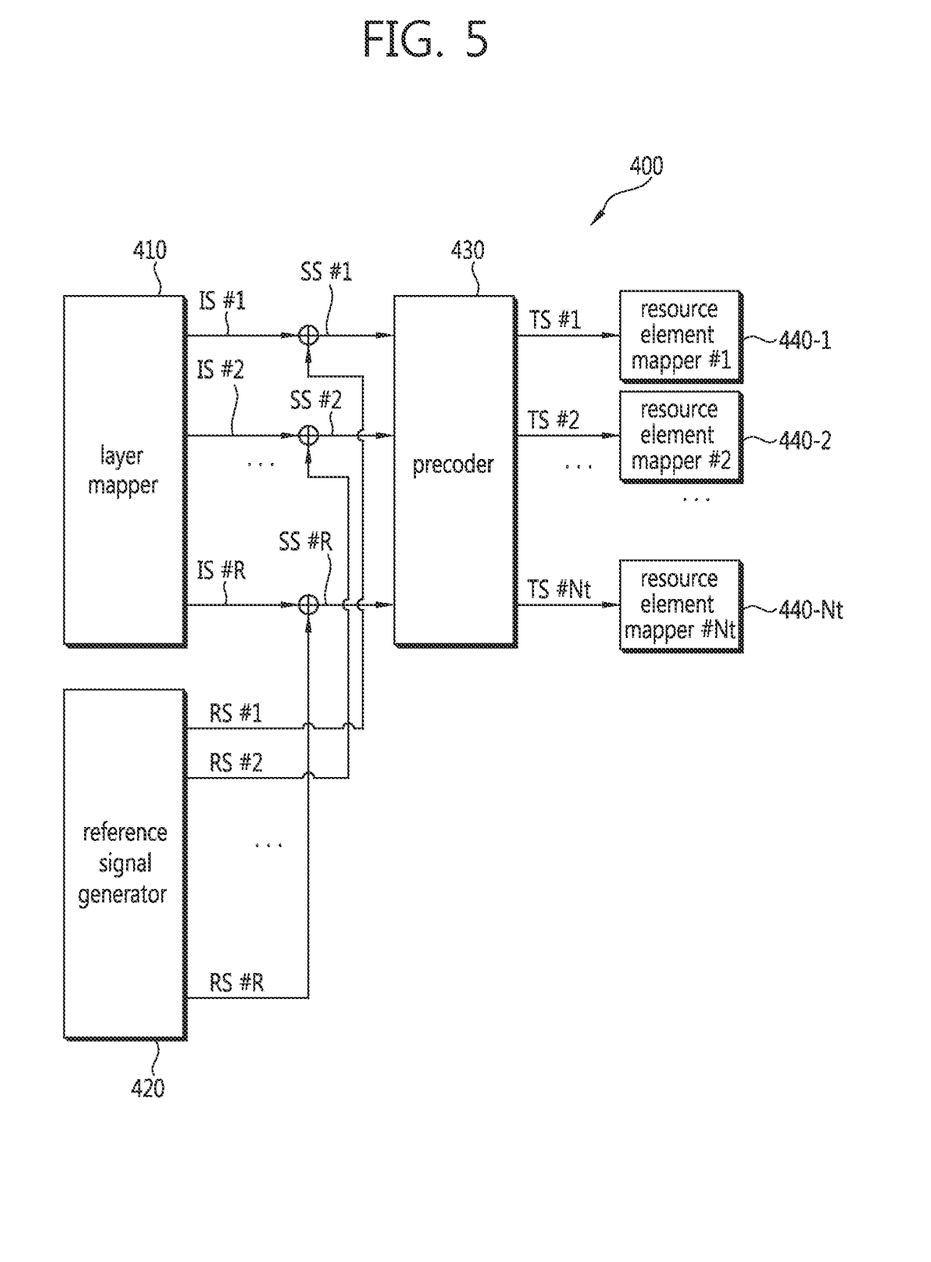
FIG. 5 is a block diagram illustrating an example where a transmitter of a node generates a P reference signal.

FIG. 5 is a block diagram illustrating an example where a transmitter of a node generates a P reference signal.

With reference to FIG. 5, a transmitter 400 comprises a layer mapper 410, a reference signal generator 420, a precoder 430, and Nt resource element mappers 440-1, ..., 440-Nt. Here, Nt represents the number of transmit antennas of the transmitter 400. It is assumed that the number of spatial layers is R.

The layer mapper 410 and the reference signal generator 420 are each connected to the precoder 430. The precoder 430 is connected to Nt resource element mappers 440-1, ..., 440-Nt. The layer mapper 410 is formed to generate R information streams. R information streams are expressed by IS #1, ..., IS #R.

The reference signal generator 420 is formed to generate R reference signal sequences. R reference signal sequences are expressed by RS #1, ..., RS #R. Each of the R reference signal sequences includes a plurality of reference signal symbols. A reference signal symbol may be a complex number symbol.

An information stream, a reference signal sequence, and a reference signal pattern are assigned to each of R spatial layers. IS #r and RS #r (where r=1, ..., R) are assigned to the spatial layer #r. Here, r is a spatial layer index indicating a spatial layer. A reference signal pattern assigned to a spatial layer #r is a time-frequency resource pattern used for transmission of RS #r.

The precoder 430 is formed to generate Nt transmit streams by carrying out precoding on R spatial streams. R spatial streams can be expressed by SS #1, ..., SS #R. Nt transmit streams can be expressed by TS #1, ..., TS #Nt.

Each of the R spatial streams corresponds to one spatial layer. In other words, SS #r corresponds to a spatial layer #r (where r=1, 2, ..., R). Each of the R spatial streams is generated based on an information stream, reference signal sequence, and reference signal pattern assigned to the corresponding spatial layer. In other words, SS #r is generated based on a reference signal pattern assigned to IS #r, RS #r, and spatial layer #r.

In other words, a precoding matrix meant for data is applied to the P reference signal, after which the P reference signal is transmitted.

A node is capable of transmitting at least one reference signal to the terminal between the P reference signal and the N reference signal. In what follows, the objective node refers to the node transmitting a signal that the terminal has to receive and the interference node refers to any node exerting interference other than the objective node.

A base station provides node information for the terminal to apply an interference removal method according to the present invention. The node information can include at least one of 1. reference signal information of an interference node, 2. precoding matrix information of an interference node, 3. information about a scheduling period and a scheduling scheme of an interference node, and 4. information indicating whether to apply an interference removal method to an interference node. Also, the node information may include information about the P reference signal of the objective node and/or information about the N reference signal of the objective node.

Now each of the information included in the node information will be described.

1) Reference Signal Information Included in an Interference Node

The pattern of a reference signal transmitted by each node is determined according to the number of antenna ports in the node, the number of data streams, node ID, and so on. Here the reference signal is the signal used for channel measurement or data demodulation while the pattern of a reference signal refers to the pattern according to which reference signal symbols are mapped to resource elements in a resource blocks consisting of a plurality of OFDM symbols in the time domain and a plurality of subcarriers in the frequency domain.

The base station informs the terminal of a reference signal transmitted from an interference node through reference signal information of the interference node. Therefore, the reference signal information of the interference node may include the number of antenna ports of the interference node, the number of data streams, node ID, reference signal sequence, and so on. The terminal figures out the reference signal transmitted from the interference node through the reference signal information of the interference node. The terminal can measure a channel between interference nodes through the reference signal.

2) Precoding Matrix Information of an Interference Node

The reference signal transmitted by a node consists of non-precoded N reference signal and precoded P reference signal as described above. In case an interference node transmits the N reference signal, since the N reference signal is transmitted without application of the precoding matrix, the terminal has to have precoding matrix information of the interference node to estimate the interference channel matrix I. The preceding matrix information of the interference node can be transmitted in the form of an index of the precoding matrix of the interference node, namely, PMI (precoding matrix index). At this time, the PMI may correspond to the PMI of the interference node when the terminal receives a first signal from the objective node, namely, the PMI in a near future. Then the terminal can know the reference signal and precoding matrix of the interference node through the reference signal information and precoding matrix information of the interference node; therefore, the interference channel matrix I (or $I_{dom}$) can be estimated.

3) Information about a Scheduling Period or Scheduling Scheme of an Interference Node Information about the scheduling period or scheduling scheme of an interference node may be required when the interference node transmits the P reference signal.

In case the interference node transmits the P reference signal, information about a scheduling period or scheme of the interference node is needed. In other words, information about the period at which the interference node changes the precoding matrix, information about whether the precoding matrix is changed dynamically/semi-statically/statically, and so on.

For example, suppose node 1 is the objective node and node 2 is the interference node with respect to the terminal and the node 2 transmits the P reference signal. Then the terminal can estimate an interference channel matrix H2P2 formed by multiplication of a channel matrix H2 between the terminal and the node 2 by the precoding matrix P2 of the node 2 through a reference signal transmitted from the node 2. However, if the precoding matrix of the node 2 at the time of estimating the interference channel matrix changes when a signal from the node 1, for which the terminal is the objective node, is received, the estimation above may become meaningless. For example, if the node 2 changes the precoding matrix dynamically, the precoding matrix at the time of estimation and the precoding matrix of the node 2 at the time of receiving a signal from the node 1 can be changed. Therefore, information about scheduling period or scheme for the node 2, which is an interference node, is necessary. If the terminal is informed of the scheduling period or scheme of the interference node, the precoding matrix of the interference node can be predicted at the time of receiving a signal from the objective node. Therefore, an interference removal method can be applied.

4) Information Indicating Whether to Apply an Interference Removal Method to an Interference Node The base station can transmit information to the terminal indicating whether to apply the interference removal method. The terminal receiving the indicating information finds a PMI minimizing interference from the interference nodes by using the interference removal method and provides the PMI found to the base station as feedback. If the terminal does not receive the indicating information, the terminal finds a PMI which maximizes a channel gain in the same manner as the conventional method without applying the interference removal method and provides the PMI found as feedback to the base station.

In what follows, an interference removal method in a multi-node system using the node information will be described in more detail. First, described will be the case where the node information includes 1. reference signal information of an interference node, 2. precoding matrix information of an interference node, 3. information about a scheduling period and a scheduling scheme of an interference node, and 4. information indicating whether to apply an interference removal method to an interference node and information about the P reference signal of the objective node.

Figure 6:
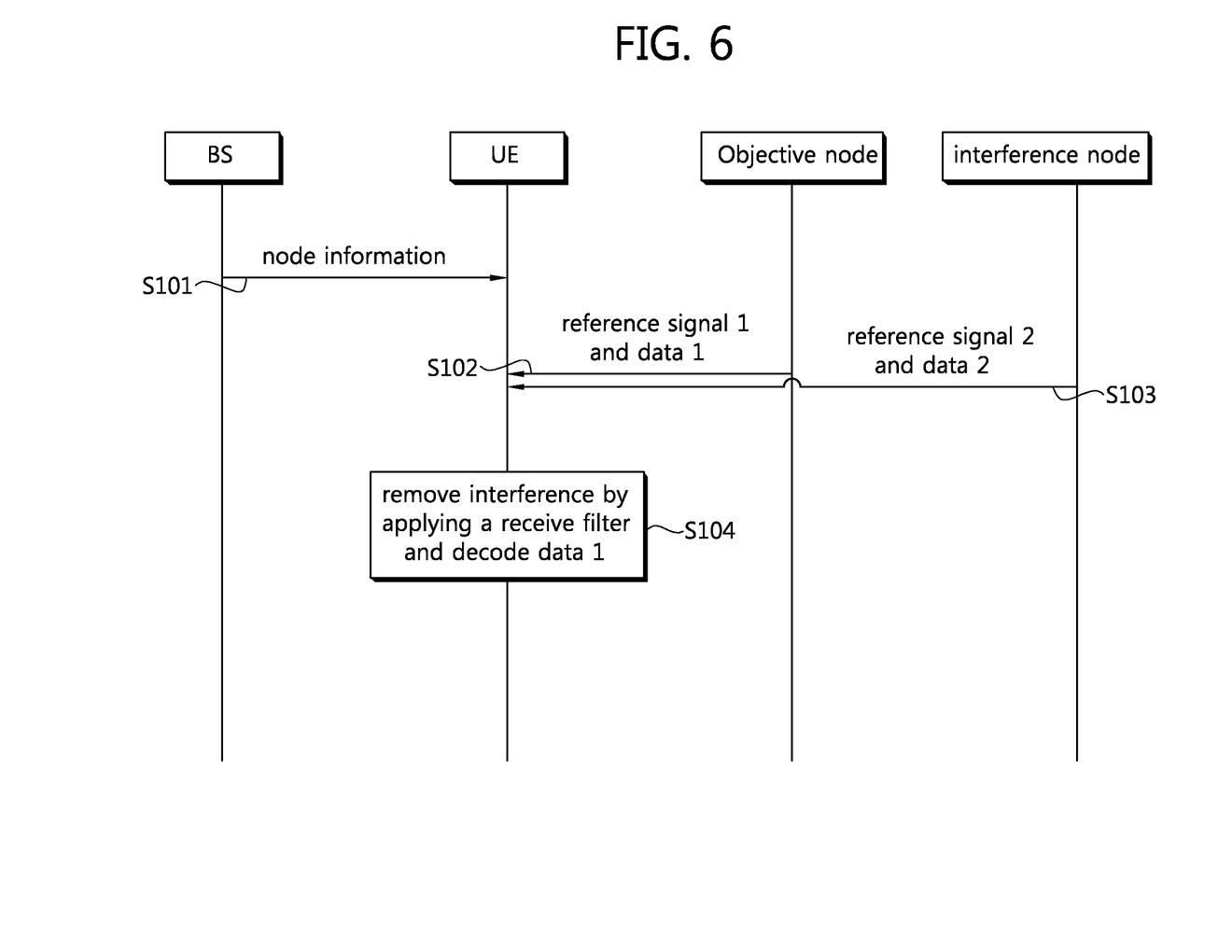
FIG. 6 is one example of an interference removal method in a multi-node system according to one embodiment of the present invention.

FIG. 6 is one example of an interference removal method in a multi-node system according to one embodiment of the present invention.

The terminal receives a first signal from the objective node S102 and receives a second signal from an interference node S103. The first signal can include a first reference signal and first data while the second signal can include a second reference signal and second data. As described above, the objective node refers to the node transmitting a signal that the terminal has to receive and the interference node refers to any node exerting interference other than the objective node. For example, in case node 1 and node 2 belong to a multi-node system and the terminal has to receive a signal from the node 1, the node 1 becomes the objective node while the node 2 becomes the interference node. In the previous example, it was assumed that only one interference node is involved; however, two or more interference nodes can be utilized. Each node belonging to a multi-node system can transmit a reference signal distinctive for each node. The reference signal can be called differently such as pilot.

The terminal remove interference caused by the second signal by applying a receive filter to a receive signal including the first and the second signal and then decodes the first signal, more specifically the first data S104. The terminal can know the P reference signal transmitted from an objective node through the node information. For example, if the objective node corresponds to the node 1, H1P1 can be known. Also, since the terminal can know the reference signal and precoding matrix transmitted by the interference node through the node information, the interference matrix (I or $I_{dom}$) with respect to the interference node can be estimated. The terminal, while making the receive filter V belong to the null space of the interference matrix I, searches for V to maximize $\|VH_1P_1\|$. Next the terminal is enabled to decode the first data from a signal to which the receive filter V has been applied. If the receive filter V does not belong to the null space of the interference matrix I, the terminal may attempt to search for V which maximizes SINR (Signal to Interference plus Noise Ratio) of $\|VH_1P_1\|$.

In what follows, described will be the case where the node information includes 1. reference signal information of an interference node, 2. precoding matrix information of an interference node, 3. information about a scheduling period and a scheduling scheme of an interference node, and 4. information indicating whether to apply an interference removal method to an interference node and information about the N reference signal of the objective node.

Figure 7:
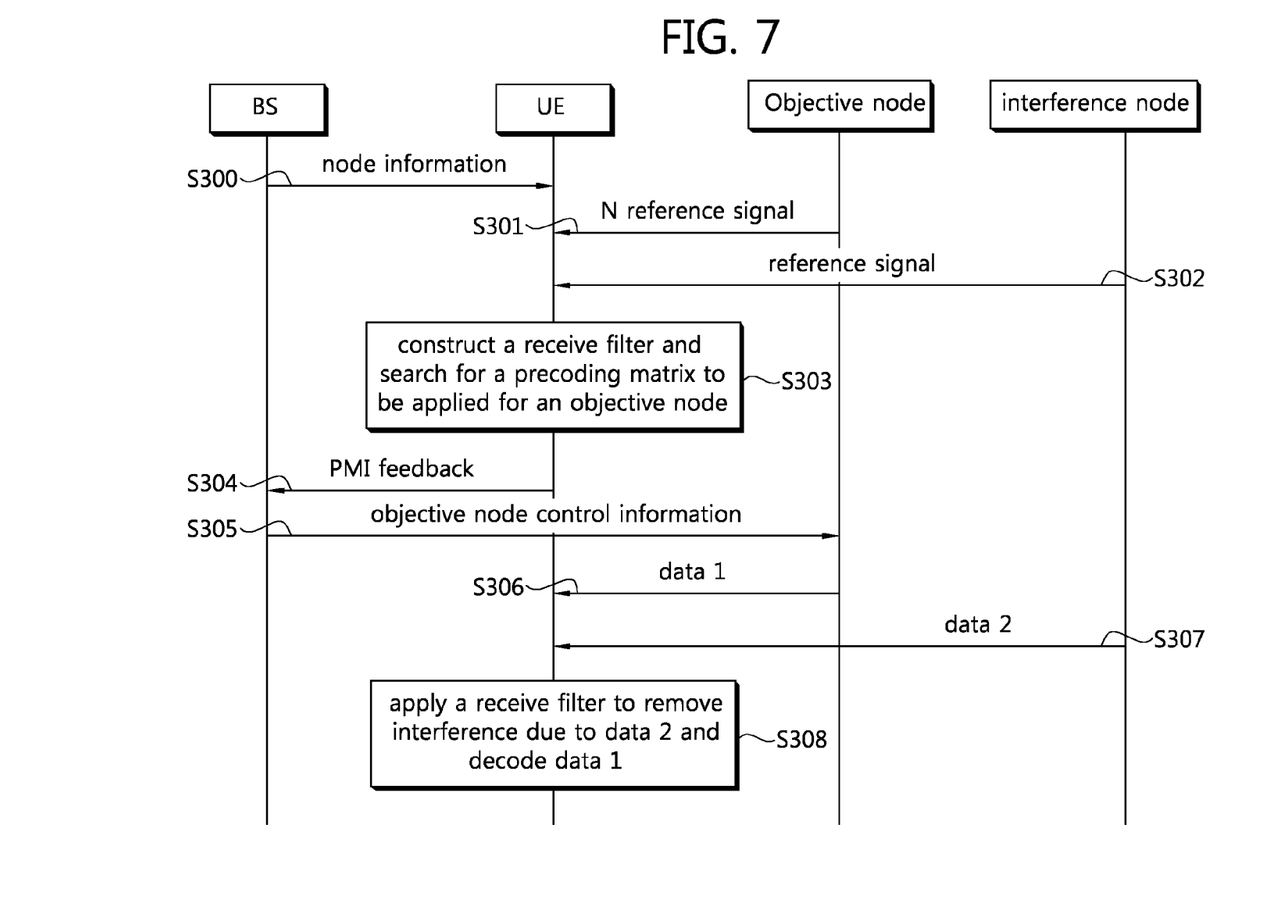
FIG. 7 is another example of an interference removal method in a multi-node system according to one embodiment of the present invention.

FIG. 7 is another example of an interference removal method in a multi-node system according to one embodiment of the present invention.

The base station transmits node information to the terminal S300. The terminal receives N reference signal from the objective node S301 and receives a reference signal from the interference node S302.

The terminal constructs a receive filter by using reference signals received from the objective node and the interference node and searches for an optimal precoding matrix to be applied to the objective node S303. For example, if node 1 is the objective node and node 2 is the interference node, the terminal can estimate the channel $H_1$ for the node 1 by using the node information and the N reference signal transmitted by the node 1; and know the channel $H_2$ (in case the node 2 transmits the N reference signal) or $H_2P_2$ (in case the node 2 transmits the P reference signal) for the node 2. Since the terminal is capable of estimating the interference matrix (I or $I_{dom}$) of the interference node by using the node information and a reference signal transmitted by the interference node, the terminal searches for V and $P_1$ to maximize $\|VH_1P_1\|$ while making the receive filter V belong to the null space of the interference matrix I. At this time, $P_1$ can be selected from the matrices within a predetermined codebook.

Information about the precoding matrix $P_1$ to be applied to the objective node is provided to the base station as feedback information S304. At this time, the terminal selects the index of the precoding matrix from the codebook and provides the PMI (Precoding Matrix Index) to the base station as feedback information. The base station transmits to the objective node objective node control information ordering the objective node to transmit data by applying the PMI transmitted by the terminal S305. The objective node transmits data 1 by applying the precoding matrix $P_1$ according to the PMI S306. At this time, it is assumed that the objective node transmits data by applying the PMI ($P_1$) provided by the terminal as feedback information; however, the present invention is not limited to the above. For example, the terminal can transmit to the objective node control information configuring data transmission by applying a precoding matrix different from the $P_1$. In this case, the objective node can transmit the P reference signal along with the data 1. Then the terminal can decode the data 1 by using the P reference signal. In other words, the objective node may transmit data only but can transmit the data along with the P reference signal. In case the objective node transmits the data only, the terminal can assume that the precoding matrix $P_1$ selected during the feedback process S304 is applied to the data. While the objective node transmits the data 1 (selectively together with the P reference signal), the interference node transmits data 2 and the data 2 acts as interference on the terminal S307. The terminal removes interference due to the data 2 by using the receive filter V obtained from the step S303 and decodes the data 1 S308.

Figure 8:
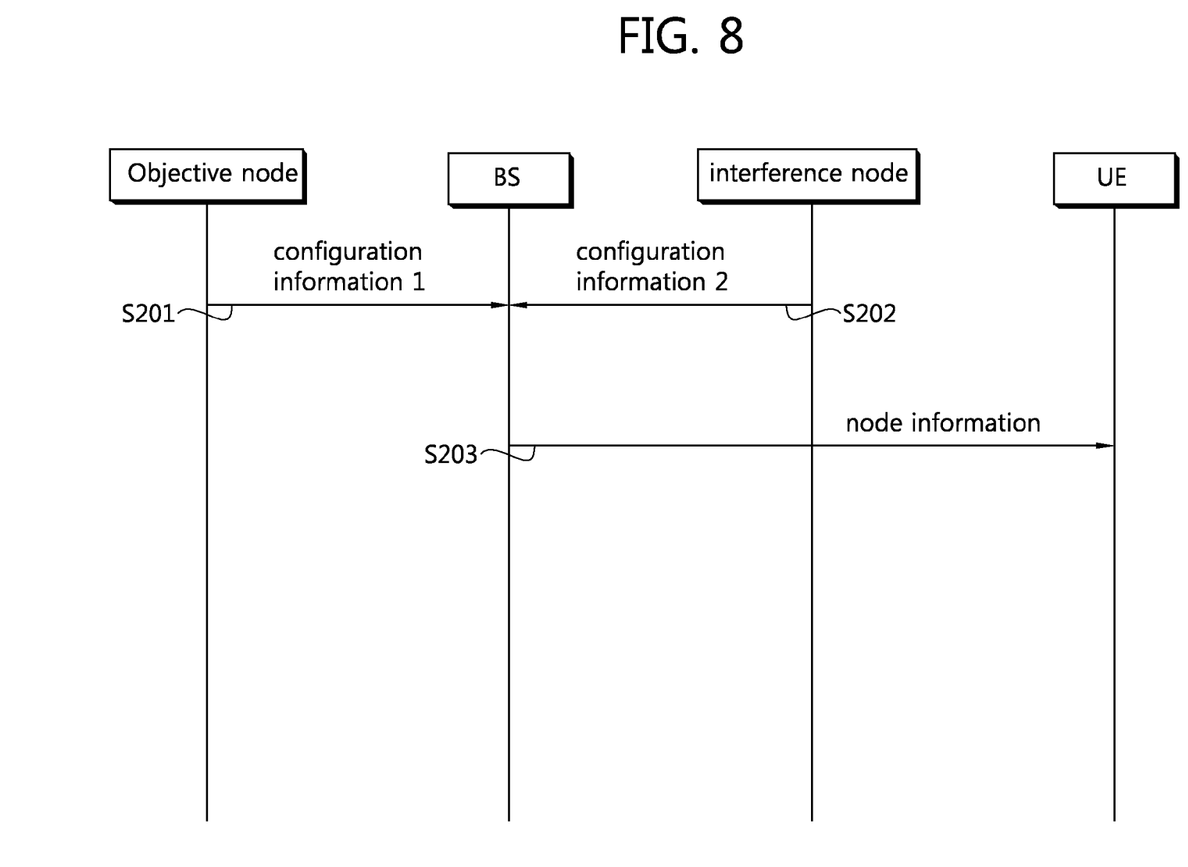
FIG. 8 illustrates a procedure of exchanging information between nodes to carry out an interference removal method in a multi-node system according to one embodiment of the present invention.

FIG. 8 illustrates a procedure of exchanging information between nodes to carry out an interference removal method in a multi-node system according to one embodiment of the present invention. Now it is assumed that the multi-node system is a multi-tier system.

With reference to FIG. 8, the objective node transmits configuration information 1 to the base station S201 and the interference node transmits configuration information 2 to the base station S202. Here, the configuration information 1 and the configuration information 2 may include at least one of 1. reference signal information of each node and 2. current PMI and future PMI of each node, and information about a scheduling period or scheme of each node.

The base station generates node information by using the configuration information 1 and 2 and transmits the node information to the terminal S203.

Although this document provides an example where the objective node and the interference node transmit configuration information to the base station, the present invention is not limited to the above example. In other words, the objective node and the interference node may exchange configuration information with each other or the configuration information can be transmitted in a unilateral direction. For example, at the time of exchanging information between a pico-cell base station and a macro base station, the configuration information may be transmitted only in a direction from the pico-cell base station to the macro base station but not vice versa.

The node information, configuration information 1, and configuration information 2 can be provided as values meant for a particular frequency band or as average values for broadband frequencies. Therefore, the node information, configuration information 1, and configuration information 2 can have an additional field indicating which frequency band the information is related to.

For example, the base station can assign a first frequency band to the terminal so that the terminal carries out estimation of an interference channel matrix only for the first frequency band. In this case, a field indicating the first frequency band can be added to the node information provided by the base station to the terminal.

Similarly the node information, configuration information 1, and configuration information 2 can be assigned to a plurality of frequency bands. For example, the base station can provide node information for each of the first and the second frequency band.

If the number of receive antennas of the terminal is larger than the total number of transmit antennas of interference nodes acting as interference, the interference channel matrix can be constructed by using only channel matrices. In other words, the interference channel matrix I can be configured as $[H_2 \ H_3 \ \ldots \ H_N]$. On the other hand, by using $I_{dom}$ consisting only of part of column vectors of the interference channel matrix I comprising channel matrices only, interference can be removed independent of the precoding scheme of the interference node.

The method described above can be used not only for downlink interference removal in a multi-node system but also for uplink interference removal.

Uplink interference occurs, for example, when an uplink signal transmitted to a macro base station by OSG terminal overlaps with an uplink signal transmitted to a pico-cell base station by CSG terminal, thereby exerting influence on the pico-cell base station.

Suppose a vector received by a pico-cell base station is y and the uplink precoding matrix and transmit data vector of an n-th terminal are $P_n$, $s_n$, respectively. Then a mathematical model such as Eq. 1 can be applied. The pico-cell base station estimates an interference channel matrix from terminals and removes interference by using multi-receive antennas in the pico-cell base station. Such an interference removal method has a high possibility of application since chances are that the number of receive antennas of the pico-cell base station is larger than the number of transmit antennas of the terminal.

On the other hand, interference can be removed by constructing the interference channel matrix by using pure channel matrix elements not including precoding. In addition, PMI of the terminal providing a maximum performance is searched and it can be requested such that the terminal can use the PMI in case of uplink transmission.

To apply the technique above for uplink transmission, each node may exchange at least one or more of the reference signal information, precoding matrix information, and scheduling period information of the terminal connected to the node with a different node. Similarly the terminal may transmit at least one or more of the information to the interference node by using a broadcast or unicast method. Then the objective node can apply an interference removal method.

Figure 9:
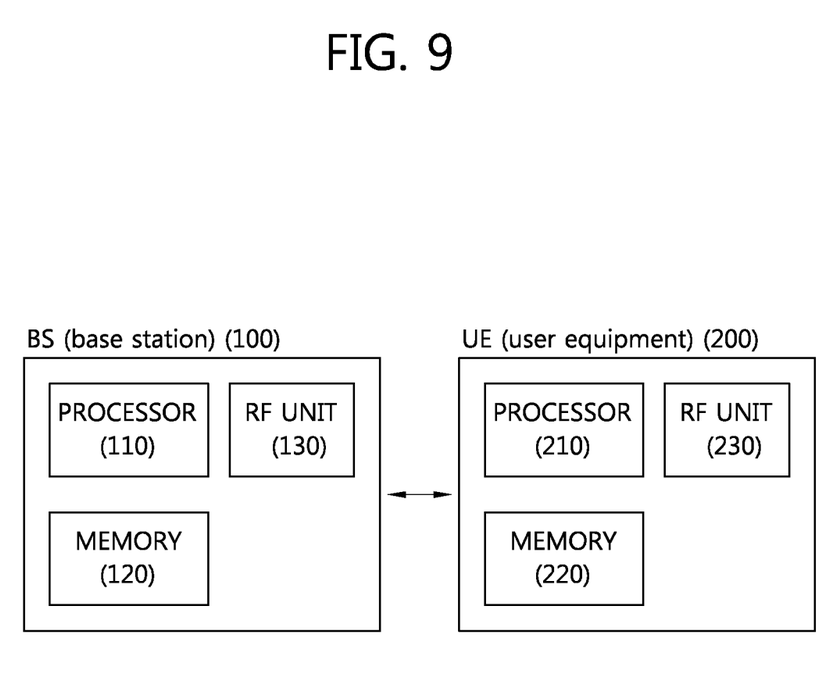
FIG. 9 is a block diagram illustrating a base station and a terminal.

FIG. 9 is a block diagram illustrating a base station and a terminal.

The base station 100 comprises a processor 110, a memory 120, and an RF unit 130. The processor 110 implements the proposed function, procedure, and/or method. In other words, the processor 110 transmits the terminal node information of each node in a multi-node system and carries out scheduling based on feedback information transmitted by the terminal. The memory 120, being connected to the processor 110, stores various types of information for driving the processor 110. The RF unit 130, being connected to the processor 110, transmits and/or receives radio signals. The RF unit 130 can comprise a plurality of nodes connected to the base station through wire.

The terminal 200 comprises a processor 210, a memory 220, and an RF unit 230. The processor 210 receives node information from a base station and receives a reference signal and data of each node. The processor 210 removes interference caused by the signal transmitted by an interference node by using the node information and reference signal. As for the interference removal method, descriptions provided above should be consulted. The processor 210 can transmit to the base station a preferred precoding matrix index with respect to an objective node. The memory 220, being connected to the processor 210, stores various types of information required for driving the processor 210. The RF unit 230, being connected to the processor 210, transmits and/or receives radio signals.

The processor 110, 210 may incorporate ASIC (Application Specific Integrated Circuit), other chipsets, logical circuits, data processing apparatus, and/or a converter which converts a baseband signal and radio signals to and from each other. The memory 120, 220 may incorporate ROM (Read-Only Memory), RAM (Random Access Memory), flash memory, memory card, storage media and/or other storage devices. The RF unit 130, 230 may include one or more antennas transmitting and/or receiving radio signals. In case the embodiments are implemented in the form of software, the techniques described above can be realized in the form of modules (procedures, functions, and so on) which carry out the functions described above. A module can be stored in the memory 110, 210 and can be carried out by the processor 110, 210. The memory 120, 220 can be installed inside or outside the processor 110, 210 and can be connected to the processor 110, 210 through various means well known to the public.

The present invention can be implemented by hardware, software, or a combination of both. In hardware implementation, the present invention can be realized by ASIC (application specific integrated circuit) designed to carried out the functions described above, DSP (digital signal processor), PLD (programmable logic device), FPGA (field programmable gate array), processor, controller, micro-processor, other electronic units, or a combination of the above. In software implementation, the present invention can be realized by modules carrying out the functions described above. Software programs can be stored in the memory unit and executed by the processor. The memory unit or processor can employ various means well known to those skilled in the art.

Preferred embodiments of the present invention have been described in detail so far; however, the present invention is not limited to the embodiments of this document and it should be understood by those skilled in the art that various modifications and changes of the present invention are possible without departing from the technical spirit and the technical scope of the present invention defined by the appended claims. Therefore, it should be understood that any foreseeable modifications of the present invention in a future should belong to the technical scope of the present invention.

The invention claimed is:

1. An interference removal method in a multi-node system, the interference removal method comprising:
   receiving, by a user equipment (UE), node information from a base station;
   receiving, by the UE, a first reference signal from an objective node;
   receiving, by the UE, a second reference signal from an interference node;
   constructing, by the UE, a receive filter and a first pre-coding matrix to be applied to the objective node by using the node information, the first reference signal, and the second reference signal;
   transmitting, by the UE, the first pre-coding matrix to the base station as feedback;
   receiving, by the UE, a receive signal including first data transmitted from the objective node and second data transmitted from the interference node;
   applying, by the UE, the receive filter to remove an interference due to the second data; and
   decoding, by the UE, the first data after removing the interference,
   wherein the node information is a singular message,
   wherein the node information includes configuration information about the first reference signal and the second reference signal,
   wherein the configuration information includes information about a number of antenna ports of the objective node and the interference node, a number of data streams, and a node identifier (ID),
   wherein a pattern of the first or second reference signal from the interference node is determined according to the number of antenna ports, the number of data streams and the node ID,
   wherein the node information further includes information related to a second pre-coding matrix associated with the second reference signal from the interference node,
   wherein the node information further includes information about a scheduling method of the interference node indicating whether the first pre-coding matrix is changed dynamically, semi-statically, or statically,
   wherein the node information further includes a field indicating whether to apply removing interference caused by the second reference signal from the interference node, and
   wherein the first data is pre-coded by applying the first pre-coding matrix, and the receive filter is constructed to exist in a null space of an interference channel matrix.

2. The interference removal method of claim 1, wherein the objective node and the interference node are connected to the base station in a wireless or wired manner and can be controlled by the base station.

3. The interference removal method of claim 1, wherein the first reference signal is a reference signal pre-coded into the first pre-coding matrix applied to the first data.

4. The interference removal method of claim 3, wherein the second reference signal is a reference signal pre-coded into the second pre-coding matrix applied to the second data.

5. The interference removal method of claim 3, wherein the second reference signal corresponds to a reference signal not pre-coded into the second pre-coding matrix applied to the second data.

6. The interference removal method of claim 1, wherein the first reference signal corresponds to a reference signal to which the first pre-coding matrix has not been applied.

7. The interference removal method of claim 1, further comprising:
   transmitting an index of the first pre-coding matrix which maximizes a first signal element to the base station after removing the interference.

8. The interference removal method of claim 7, wherein the index of the first pre-coding matrix which maximizes the first signal element corresponds to the index of a matrix selected from a predetermined codebook.

9. A terminal, comprising:
a radio frequency (RF) unit configured to transmit and receive radio signals; and
a processor connected to the RF unit,
wherein the processor is configured to:
receive node information from a base station,
receive a first reference signal from an objective node,
receive a second reference signal from an interference node,
construct a receive filter and a first pre-coding matrix to be applied to the objective node by using the node information, the first reference signal, and the second reference signal,
transmit the first pre-coding matrix to the base station as feedback,
receive a receive signal including first data transmitted from the objective node and second data transmitted from the interference node,
apply the receive filter to remove an interference due to the second data, and
decode the first data after removing the interference,
wherein the node information is a singular message,
wherein the node information includes configuration information about the first reference signal and the second reference signal,
wherein the configuration information includes information about a number of antenna ports of the objective node and the interference node, a number of data streams, and a node identifier (ID),
wherein a pattern of the first or second reference signal from the interference node is determined according to the number of antenna ports, the number of data streams and the node ID,
wherein the node information further includes information related to a second pre-coding matrix associated with the second reference signal from the interference node,
wherein the node information further includes information about a scheduling method of the interference node indicating whether the first pre-coding matrix is changed dynamically, semi-statically, or statically,
wherein the node information further includes a field indicating whether to apply removing interference caused by the second reference signal from the interference node, and
wherein the first data is pre-coded by applying the first pre-coding matrix, and the receive filter is constructed to exist in a null space of an interference channel matrix.

* * * * *